United States Patent [19]

Saxby et al.

[11] 4,327,520

[45] May 4, 1982

[54] CLOCHES

[76] Inventors: Michael E. Saxby, The Hawthorns, Norton Lea, Norton Lindsey, Warwickshire; John W. Rilett, 6, Old Quarry, Bibury, Gloucestershire, both of England

[21] Appl. No.: 164,126

[22] Filed: Jun. 30, 1980

[30] Foreign Application Priority Data

Jul. 5, 1979 [GB] United Kingdom ............... 23444/79

[51] Int. Cl.³ .............................................. A01G 13/04
[52] U.S. Cl. .......................................... 47/29; 135/2; 135/20 R; D3/5
[58] Field of Search ............................... 47/17, 20-21, 47/26-32; D3/5-17; 135/20-48, 1 D, 2, DIG. 2

[56] References Cited

U.S. PATENT DOCUMENTS

| | | | |
|---|---|---|---|
| 1,011,017 | 12/1911 | Bevill | 47/28 |
| 2,103,948 | 12/1937 | Jones | 135/20 R |
| 2,598,686 | 6/1952 | Griffin | 135/20 R |
| 3,386,455 | 6/1968 | O'Rear | 135/20 R |
| 3,802,451 | 4/1974 | Morris | 135/20 B |
| 3,863,660 | 2/1975 | Glaeser | 135/20 R |
| 3,892,251 | 7/1975 | Warfield | 135/20 R |
| 4,194,319 | 3/1980 | Crawford | 47/27 |

FOREIGN PATENT DOCUMENTS

| | | | |
|---|---|---|---|
| 1165212 | 10/1958 | France | 47/29 |
| 1199661 | 12/1959 | France | 47/29 |
| 1215951 | 4/1960 | France | 47/29 |
| 250283 | 6/1948 | Switzerland | 47/29 |

Primary Examiner—Robert E. Bagwill
Attorney, Agent, or Firm—Neil F. Markva

[57] ABSTRACT

A garden cloche comprising an umbrella structure, a spike 12 and a handle 11. A canopy 10 of transparent sheet plastics material is supported on a framework so that an apex part 23 of the shaft 20 projects through the canopy and carries the handle above the canopy. A bottom end part 32 of the shaft serves as or is located in said spike means which is inserted into the soil 40 of a garden to locate the periphery 30 of the canopy proximal to the surface of the soil 40.

7 Claims, 2 Drawing Figures

U.S. Patent
May 4, 1982
4,327,520
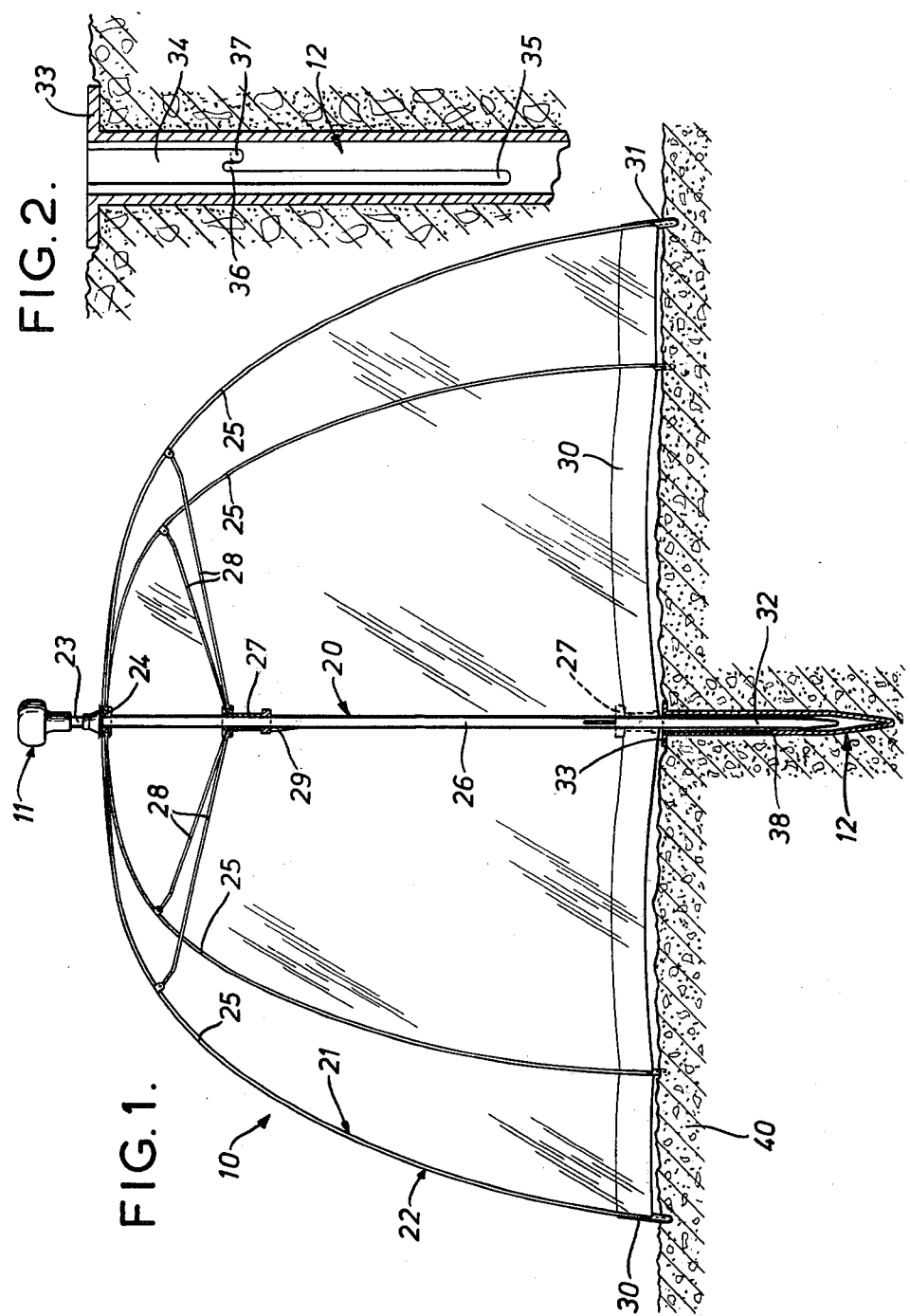

CLOCHES

BACKGROUND OF THE INVENTION

There are many known forms of garden cloches, but most of those forms which are efficient for growing purposes are also expensive, time consuming to assemble and to erect, and inconvenient to reposition in the garden. What is needed is an inexpensive and efficient cloche which can be erected and resited very quickly and easily.

SUMMARY OF THE INVENTION

According to the present invention there is provided a garden cloche in situ in a garden. The cloche comprises an umbrella structure, spike means and handle means. The umbrella structure comprises a shaft, a framework on said shaft, a canopy on said framework. The canopy comprises sheet plastics light permeable material. The shaft comprises a bottom part and an apex part which projects through the canopy and carries the handle means above the canopy. The bottom end part includes spike means with the framework being extended to deploy the canopy. The spike means is inserted into the soil of the garden to locate the periphery of the canopy proximal to the surface of the soil.

In particular the invention provides a garden cloche which incorporates a mass-produced umbrella structure having a shaft on which are mounted a framework and canopy arranged so that the depth of the canopy is greater than half of the overall width of the canopy when the framework is fully opened. The canopy is composed of transparent or translucent sheet plastics material. An apex part of the shaft projects through the canopy and includes a knob or handle. A bottom end part of the shaft, remote from the apex part, includes an elongate spike which is dimensioned so that, in use, when the framework is fully opened, the spike can be inserted into level soil by pressing vertically downwards on the knob or handle until peripheral end parts of the framework abut, engage or are proximal to the soil. Thus, the canopy forms a cover or enclosure over an area of said soil.

The spike may be constituted by, secured to or detachably located on said bottom end part of the shaft. The bottom end part is preferably short and extends from a longer intermediate portion of the shaft, which intermediate portion is radially surrounded by the framework and canopy when the framework is fully opened. The intermediate portion is preferably longer than the spike, for example, it may be two or three times the length of the spike.

The invention also includes a method of providing a garden cloche by utilizing a mass-produced umbrella structure having a shaft on which are mounted a framework and canopy arranged so that the depth of the canopy is greater than half of the overall width of the canopy when the framework is fully opened. The shaft has an apex part which projects through the canopy which is composed of a transparent or translucent sheet plastics material. A knob or handle is disposed on the apex part and a spike on a bottom end part of the shaft remote from the apex part. The framework is opened and the knob or handle is pressed down to push the spike into soil until peripheral end parts of the framework enter, abut or are proximal to the soil.

If a complete umbrella structure is utilized, the spike may be provided by removing the usual umbrella handle from the bottom end part of the shaft, and thereafter using said bottom end part as the spike or inserting said bottom end part into the spike.

BRIEF DESCRIPTION OF THE DRAWINGS

The invention will be described further, by way of example with reference to the accompanying drawings in which:

FIG. 1 shows a garden cloche of the invention in vertical cross section; and

FIG. 2 shows an enlarged cross section of part of a spike of the cloche.

DETAILED DESCRIPTION

The garden cloche comprises an umbrella structure 10 together with handle means in the form of a knob 11 and spike means in the form of a spike 12.

The umbrella structure is of mass-produced form, from which the usual umbrella handle is omitted, and comprises a shaft 20, a framework 21, and a canopy 22. The shaft 20 has an apex part 23 which projects through the canopy 22 and supports a fixed collar assembly 24 to which the canopy 22 and ribs 25 of the framework are attached in known manner. An intermediate portion 26 of the shaft supports a sliding collar 27 to which stretchers 28 of the framework are connected in known manner. An upper catch 29 serves releasably to retain the collar 27 in an upper position, as shown, to hold the framework 21 in the fully open condition as shown in the drawing. The catch 29 can be released to allow the framework 21 to be collapsed by moving the collar 27 to the lower position shown in broken lines. The canopy 22 is made from transparent vinyl plastics material, and includes peripheral reinforcement 30 of a tough opaque plastics material. Frame end caps 31 are secured to reinforcement 30 and are fitted onto the ribs 25 so as to secure together the canopy 22 and ribs at the peripheral end parts of the framework 21.

The intermediate portion 26 is surrounded radially by the canopy 22 in the fully open condition, and extends between the apex part 23 and a bottom part 32. The bottom part 32 extends downwardly below the level of the periphery of the open canopy, and slidingly fits into the spike 12. The spike 12 has a flange 33 around a mouth at a top end, and has a closed pointed bottom end.

The spike 12 is molded so as to have an internally open elongate slot or channel which, as shown in FIG. 2, has a wider upper portion 34 and a narrower lower portion 35. Portions 34 and 35 join adjacent a stop 36 alongside a socket 37 at the bottom of the upper portion 34. The bottom part 32 has a radially projecting peg 38 which slidably engages in the slot or channel so as to be movable vertically and engageable in the socket 37.

The cloche is shown in an in use position in which the spike 12 is inserted into the soil 40 and the part 32 is inserted into the spike 12 so that the peg 38 slides down the portion 34 until the caps 31, at the peripheral end parts of the framework, dig into the soil 40. Thus, the canopy serves as an enclosure above an area of the soil within the periphery of the canopy.

The cloche in this example is generally dimensioned so that the overall diameter of the canopy is about three times the spike length. The overall height of the canopy and the length of the intermediate portion are about twice the spike length. The length of the bottom end part is about two thirds of the spike length. Furthermore, the stretchers are disposed wholly in the upper quarter of the open canopy so as to leave at least three quarters of the overall height of the canopy unobstructed and available for the growth of plants.

The cloche offers a number of advantages, e.g. (1) The umbrella structure is resistant to corrosion, light, easily collapsible and openable, inexpensive, and requires no dismantling for storage.

(2) The cloche can be raised easily by pulling on the knob to pull the spike or the end part outwardly and turning the knob to engage the peg 38 in the socket 37 to thereby hold the cloche in the raised position to provide a ventilation gap under the periphery of the canopy. The cloche may be raised further to facilitate watering of the plants.

(3) Soil can be piled on or against the reinforcement to weight the cloche in windy weather.

(4) The cloche can be erected, installed in position, resited, and collapsed for storage quickly, easily, and without any assembling or dismantling, other than possibly having to extract the spike from the soil and to reinsert the bottom end part into the spike.

(5) For growing purposes, the cloche has good transparency to light, is easily cleaned by hosing down the canopy, obstructs the entry of insects into the enclosure, and is stable in moderate weather conditions, is substantially rot proof, and allows all round visual inspection of the plants.

The invention is not confined to the precise details of the foregoing example, and many variations are possible within the scope of the invention.

For example, the spike 12 can be omitted and the bottom end part 32 used as the spike and preferably lengthened to about half or two thirds of the length of the intermediate portion in view of the thinness of the shaft. The spike may be blunt or sharp.

While the cloches have been shown and described in detail, it is obvious that this invention is not to be considered as being limited to the exact form disclosed, and that changes in detail and construction may be made therein within the scope of the invention, without departing from the spirit thereof.

We claim:

1. A garden cloche comprising:
   (a) an umbrella structure including a canopy stretchingly attached to a framework which is mounted on a shaft,
   (b) said framework including a collar assembly fixed to the shaft, and a single carrier movably disposed on the shaft between an open framework position and a closed framework position.
   (c) catch means for releaseably holding the single carrier in a fully opened position of the framework,
   (d) said canopy having a depth greater than half of the overall width of the canopy when the framework is in the fully opened position,
   (e) the canopy being formed of a transparent or translucent plastic sheet material,
   (f) the shaft including an apex part and a bottom end part,
   (g) said apex part projecting through the canopy and supporting the fixed collar assembly and a knob or handle,
   (h) said bottom end part being remote from the apex part and including an elongate spike having a length, which length is sufficient to enable the bottom end part, when the framework is fully opened, to be inserted into level soil by pressing vertically downwardly on the knob or handle until peripheral end parts of the framework abut, engage or are proximal to the soil,
   (i) said canopy being stretched over the framework with said single carrier releaseably held in said fully opened position by the catch means to form a covering enclosure over a defined area of the soil.

2. A cloche as defined in claim 1 wherein
   said shaft includes an intermediate portion located between the apex and bottom end parts,
   said intermediate portion is longer than the bottom end part.

3. A cloche as defined in claim 2 wherein
   the intermediate portion is between two and three times the length of the spike.

4. A cloche as defined in any one of claims 1, 2 or 3 wherein
   the framework includes stretchers which are disposed, when the framework is fully opened, within an upper portion of the canopy so that at least three quarters of the overall height of the canopy is left unobstructed by the stretchers.

5. A cloche as defined in claim 4 wherein
   the canopy includes a peripheral reinforcement secured to the framework.

6. A cloche as defined in any one of the claims 1, 2 or 3 wherein
   said spike is constituted by said bottom end part.

7. A cloche as defined in any one of the claims 1, 2 or 3 wherein
   said spike is disposed around said bottom end part, and
   said bottom end part is slidingly fit in the spike.

* * * * *